(12) United States Patent
Mezaael et al.

(10) Patent No.: US 11,580,790 B2
(45) Date of Patent: Feb. 14, 2023

(54) SYSTEM AND METHOD FOR SMART CONTRACT MANAGEMENT USING DTCS

(71) Applicant: Ford Global Technologies, LLC, Dearborn, MI (US)

(72) Inventors: Abraham Mezaael, Southfield, MI (US); Yamen Taleb, Dearborn Heights, MI (US); Wassim Mahmoud Nahle, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 16/990,565

(22) Filed: Aug. 11, 2020

(65) Prior Publication Data

US 2022/0051487 A1 Feb. 17, 2022

(51) Int. Cl.
- *G07C 5/00* (2006.01)
- *G07C 5/08* (2006.01)
- *G06Q 40/08* (2012.01)

(52) U.S. Cl.
CPC ......... *G07C 5/008* (2013.01); *G07C 5/0808* (2013.01); *G07C 5/0841* (2013.01); *G06Q 40/08* (2013.01)

(58) Field of Classification Search
CPC ..... G07C 5/008; G07C 5/0808; G07C 5/0841
See application file for complete search history.

(56) References Cited

U.S. PATENT DOCUMENTS

| | | | | |
|---|---|---|---|---|
| 10,430,883 B1 * | 10/2019 | Bischoff | ........... | G06Q 20/14 |
| 10,719,501 B1 * | 7/2020 | Leise | ........... | G06F 16/9024 |
| 10,872,381 B1 * | 12/2020 | Leise | ........... | H04L 9/0637 |
| 10,891,694 B1 * | 1/2021 | Leise | ........... | H04L 9/3239 |
| 2019/0220930 A1 * | 7/2019 | Clark | ........... | B60W 10/18 |
| 2021/0084015 A1 * | 3/2021 | Benson | ........... | H04L 63/0428 |
| 2021/0326992 A1 * | 10/2021 | Leise | ........... | H04L 9/3249 |
| 2021/0342946 A1 * | 11/2021 | Leise | ........... | G06Q 20/4015 |

FOREIGN PATENT DOCUMENTS

GB      2562054 A      7/2018

OTHER PUBLICATIONS

Lennan Bader, et al., "Smart Contract-based Car Insurance Policies," IEEE 2018, 7 pages.

* cited by examiner

Primary Examiner — Sizo B Vilakazi
(74) Attorney, Agent, or Firm — Joseph Zane; Brooks Kushman, P.C.

(57) ABSTRACT

A vehicle system may include a memory of a vehicle configured to maintain at least one smart contract between a manufacturer of the vehicle and a supplier of components to the manufacturer, and a processor of the vehicle configured to receive at least one diagnostic code from the vehicle, the diagnostic code being associated with at least one vehicle component, in response to the code being identified by the processor as being associated with the at least one smart contract, update the at least one smart contract within the memory with the code, and transmit the smart contract, as updated, to a third party associated with the vehicle component.

17 Claims, 3 Drawing Sheets

SYSTEM AND METHOD FOR SMART CONTRACT MANAGEMENT USING DTCS

TECHNICAL FIELD

Disclosed herein are systems and methods for smart contract management using Diagnostic Trouble Codes (DTCs).

BACKGROUND

As autonomous vehicle features increase in today's vehicles, more and more data regarding the operation of the vehicle and its systems is available. DTCs are one form of data provided by certain vehicle components. These codes may provide information about the operation of certain vehicle systems and parts and may have various categories and types as a result of having different vehicle level architecture.

SUMMARY

A vehicle system may include a memory of a vehicle configured to maintain at least one smart contract between a manufacturer of the vehicle and a supplier of components to the manufacturer, and a processor of the vehicle configured to receive at least one diagnostic code from the vehicle, the diagnostic code being associated with at least one vehicle component, in response to the code being identified by the processor as being associated with the at least one smart contract, update the at least one smart contract within the memory with the code, and transmit the smart contract, as updated, to a third party associated with the vehicle component.

A smart contract system for managing vehicle error codes may include a memory configured to maintain at least one smart contract associated with a vehicle; and a processor configured to receive at least one diagnostic code from the vehicle, the diagnostic code being associated with at least one vehicle component, determine that the code is a valid code, in response to determining that the code is a valid code, determine whether the code is relevant to the at least one smart contract, and in response to the code being relevant, update the at least one smart contract within the memory with the associated code, and transmit the updated smart contract to a third party associated with the smart contract.

A method for managing smart contracts and vehicle error codes relevant to the smart contracts may include receiving at least one diagnostic code from a vehicle, the diagnostic code being associated with at least one vehicle component, determining that the code is a valid code, in response to determining that the code is a valid code, determining whether the code is relevant to at least one smart contract, and in response to the code being relevant, updating the at least one smart contract within with the associated code, and transmit the updated smart contract to a third party associated with the smart contract.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles include hundreds of modules, components, controllers, etc. These components may interact with a vehicle control system and produce and transmit data, messages, outputs, etc. One form of data provided by vehicle components are diagnostic trouble codes (DTCs). These codes may indicate potential triggers of the component that provided the code.

In autonomous vehicles, these codes may provide valuable information to a vehicle manufacture, an insurance company, as well as a supplier responsible for manufacturing the specific vehicle component supplying the code. Specifically, for autonomous vehicles, insurance companies may be interested in the information provided by the codes for coverage methods and ownership. The insurance companies may use this information to generate price offerings, as well as manage claims.

Disclosed herein is a vehicle system that may provide DTCs to a server and uses smart contracts based on block chain to manage and optimize DTCs. For example, if a vehicle provides a DTC relating to a Blind Spot Information System (BLIS), indicating that a right side blind spot sensor is blocked, the system may associate the block with a smart contract between an original equipment manufacturer (OEM) and the supplier of the BLIS. The system may update the smart contract with the DTC and send the updated smart contract to the supplier of the BLIS. Thus, the system may attribute the issue back to the supplier via the smart contract and without oversight by another party. Additionally or alternatively, insurance companies may desire such information for claim purposes.

Figure 1:
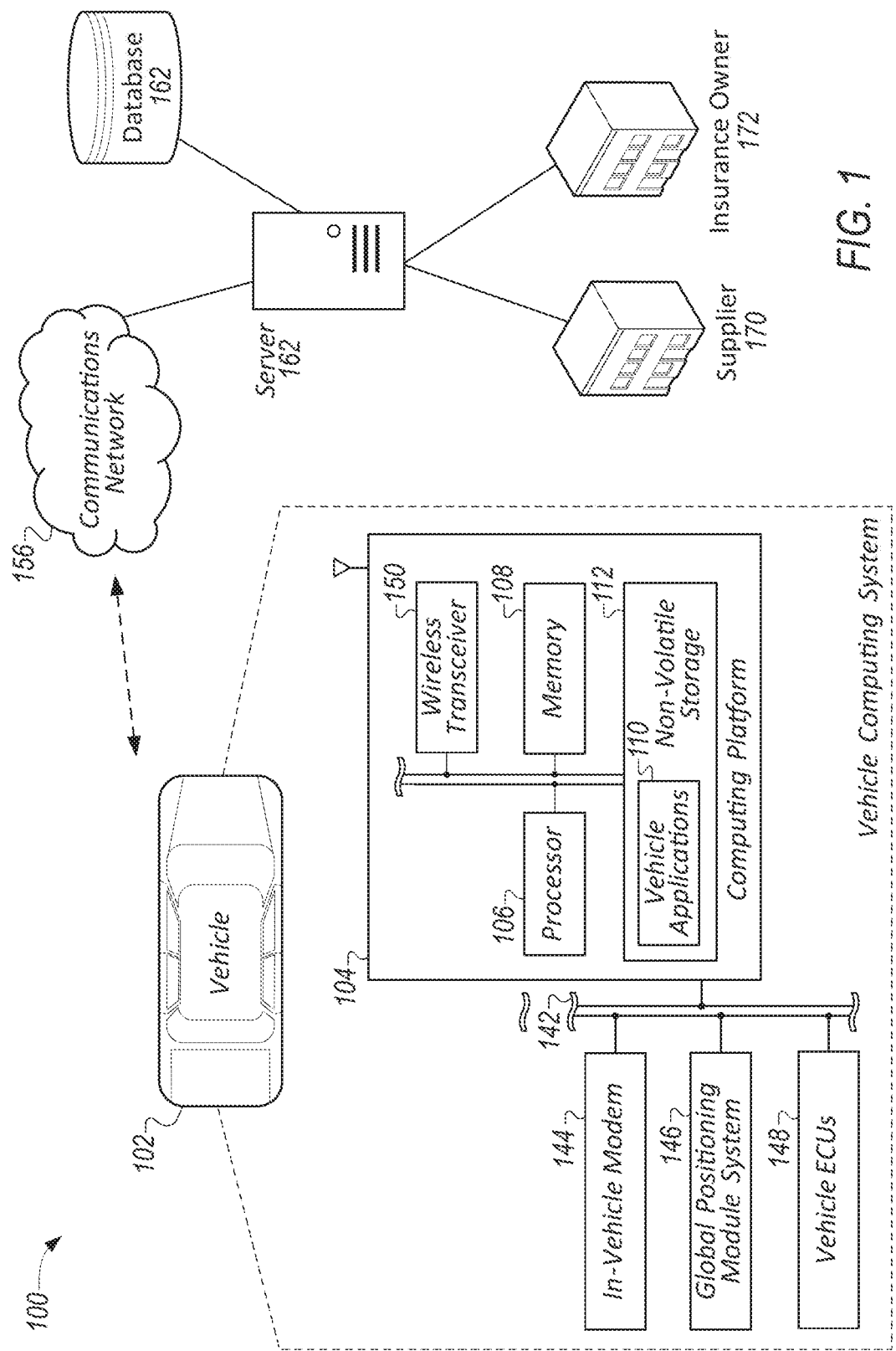
FIG. 1 illustrates an example diagram including a vehicle configured to access telematics servers and a mobile device having a platoon subscription application.

FIG. 1 illustrates an example system 100 including a vehicle 102 configured to access telematics servers. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable storage medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. The computing platform 104 may be further configured to communicate with other components of the vehicle 102 via one or more in-vehicle networks 142. The in-vehicle networks 142 may include one or more of the controller area network (CAN), an Ethernet network, and a media-oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 (or global navigation satellite system (GNSS) configured to provide current vehicle 102 location and heading information, and various vehicle electronic control units (ECUs) 148 configured to incorporate with the computing platform 104. As some non-limiting possibilities, the vehicle ECUs 148 may include a powertrain control module (PCM) configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

The ECUs 148 may also include other systems such as remote detection systems such as BLIS, light detection and ranging (LIDAR) systems, other acceleration and sonar sensors, etc. These systems, and the systems described herein may be supplied to OEMs by third-party suppliers.

The ECUs 148 may communicate with the computing platform 104 over the in-vehicle network 142. In other examples, the computing platform 104 may be connected to more or fewer in-vehicle networks 142. Additionally or alternately, one or more controls, such as human machine interface (HMI) controls, etc., or other components may be connected to the computing platform 104 via different in-vehicle networks 142 than shown, or directly without connection to the in-vehicle network 142.

The communications network 156 may provide communications services, such as packet-switched network services (e.g., Internet access, VoIP communication services, vehicle to vehicle, over the air, etc.), to devices connected to the communications network 156. An example of a communications network 156 may include a cellular telephone network, other networks that facilitates wireless communication. The ECUs 148 such as the BLISS, LIDAR, etc., may send DTCs to the server via the communications network 156.

A server 162 may be external or internal to the vehicle or another structure. The server 162 may also be a cloud based server. The server 162 may include multiple devices or processors, as well as include storage mediums, applications, transceivers, etc. The server 162 may include or be in communication with a DTC database 164. This database 164 may maintain data relating to DTCs received from the vehicle 102 over the communications network 156. This is described in greater detail herein. The server 162 may generate a smart contract resulting from the DTCs received from the vehicle 102.

The server 162 may include one or more processors configured to perform instructions, commands and other routines in support of the processes described herein. For instance, the server may be configured to execute instructions of the processes described in FIGS. 2 and 3, to update and provide smart contracts to third parties in response to receiving certain DTCs. Such instructions and other data may be maintained in a non-volatile manner using a variety of types of computer-readable storage mediums such as the database 164 or other memories. The mediums (also referred to as a processor-readable medium or storage) includes any non-transitory medium (e.g., a tangible medium) that participates in providing instructions or other data that may be read by the processor of the server. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. While the server 162 and the computing platform are described herein as each carrying out specific processes and instructions, each may carry out processes described with the other.

As explained above, DTCs are codes used by vehicle manufactures to gather information about vehicle components and systems. Often, these codes are transmitted via on board communications. The codes may relate to an error in a certain component, or simply note an anomaly in data provided by a component. DTCs have various categories and types as a result of having different vehicle level module architecture that is based on a vehicle identification number (VIN) level per vehicle. Thus, managing DTCs may be a complex process.

Generally, DTCs typically include a five-digit code. Each digit may indicate certain information. For example, the first digit may be one of four letters, each indicating a vehicle module, such as "B", relating to body functions such as driver with assistance, comfort, convenience, and safety; "C", relating to chassis such as mechanical systems such as brakes, steering and suspension; "P", relating to powertrain, such as engine, transmission and associated drivetrain accessories; and "U", relating to functions that are shared among computers and systems on the vehicle. The second digit may indicate whether the DTC is a generic or manufacture specific code. For example, a "0" may indicate a generic code, while a "1" may indicate a manufacture specific code.

The third digit may represent the affected system, for example, measurement of air and fuel, ignition system, additional emission control, speed and idle regulation, computer input and output signals, transmission, etc. The last two digits may represent numbers relating to the error and specific to the vehicle module. For example, a DTC of "P0183" may indicate a "Fuel Temperature Sensor Circuit High Voltage," where a DTC of "B1328" may indicate a "RH Sun Load Sensor Fault."

In some examples the DTCs are considered 'pending' codes. Pending codes may be caused by intermittent faults or faults that the PCM may need to validate prior to transmitting the DTC to the server 162. For example, the PCM may require that the DTC code be received from the respective module for a certain amount of warm-up or key-on cycles prior to transmitting the code to the server 162. For example, if the fault does not reappear within 40 warm-up cycles, the code may be cleared and disregarded. If the fault appears for the specified number of times, the code will then mature into a DTC and the PCM may transmit the code to the server 162. This may prevent unconfirmed faults from being included in a smart contract at the server 162.

The server 162 may generate smart contracts based on the DTCs received from the vehicle. Generally, smart contracts involve a computer protocol designed to digitally verify and enforce performance of an agreement between parties of the agreement. Typically, smart contracts allow for enforcement or performance without the need for a third party. Smart contracts may be stored on blockchain technology that allows for encryption and security. The smart contract may be used by the insurance owner 172 to enhance and generate price offerings, as well as manage claims.

A supplier 170 may also be in communication with the server 162. The supplier may be one or more suppliers responsible for one or more vehicle components. For example, the supplier may manufacture and provide controllers such as the ECU within the vehicle 102. The supplier may provide mirrors, handles, doors, heating components, etc. In the examples herein, the supplier 170 may provide the BLIS for the vehicle 102.

An insurance owner 172 may also be in communication with the server 162. The insurance owner may be an insurer for an individual owner or driver of the vehicle 102. The insurance owner 172 may also be a fleet insurer, supplier insurer, etc. The insurance owner 172 may have an interest in the statuses of various vehicle components over time, or even at a specific time. Such statuses may include faults indicated by the DTCs.

The supplier 170 and insurance owner 172 may receive smart contracts from the server 162. These third-party entities may use the smart contract to comply, price, mitigate, etc., based on the smart contract and its obligations. For example, if the DTC code "B1250 BLIS Right Side blocked" is included in the smart contract, and is verified as being confirmed, then the supplier 170 may receive this information via the smart contract from the server 162.

Figure 2:
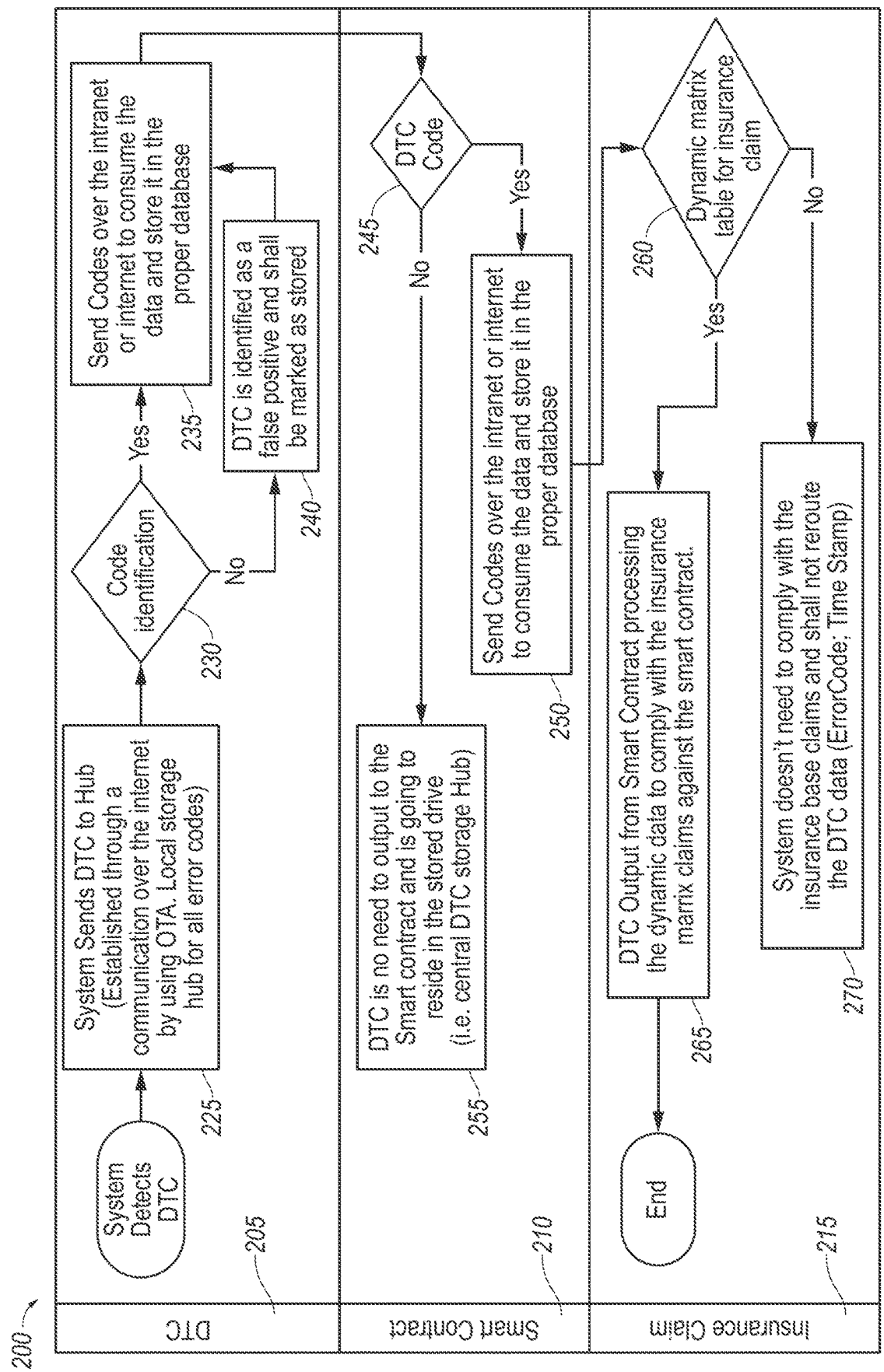
FIG. 2 illustrates an example block diagram of flow chart of the system of FIG. 1.

FIG. 2 illustrates an example flow chart illustrating a process 200 of the system of FIG. 1. A process 200 is broken into three parts, a DTC portion 205, smart contract portion 210, and a claim portion 215. In the DTC portion 205, at block 225, the computing platform 104 may receive a DTC from a vehicle ECU 148 or other module. At block 230, the processor 106 may determine whether the DTC is a valid code or a false positive. This may be determined by the processor 106 determining whether the error code was received from the respective module for a certain amount of warm-up or key-on cycles, as explained above. If the processor 106 determines that the code is valid, the process 200 proceeds to block 235 where the code is then sent to the server 165. If the code is found to be not valid, or a false positive, the process 200 proceeds to block 240 where the code may be temporarily stored and await validation prior to being transmitted to the server 162.

In the smart contract portion 210, the process 200 may proceed to block 245. At block 245, the server 162 may determine whether the DTC should be included in a smart contract. For example, is the DTC code one that could be considered relevant to a third-party such as the supplier 170 and/or the insurance owner 172. The server 162 may maintain a list of relevant DTCs in database 164. The server 162 may compare the received DTC from the vehicle 102 with the list of relevant DTCs to determine whether the DTC should be considered in a smart contract. The DTC database 164 may also manage the smart contracts and cross reference the relevant DTCs with the smart contracts to determine whether the DTC should be included in the smart contract.

If the DTC is determined to be relevant, the process 200 proceeds to block 250. If not, the process 200 proceeds to block 255. At block 250, the server may integrate the DTC into one or more smart contracts. This may be in the form of a table and/or matrix which may be used for enforcement of the contract. As explained above, these matrices are dynamic, and used to deal with the complex nature of some of the contracts and relevant DTCs. At block 255, the server 162 may store the DTC in the DTC database 164, but may not integrate or generate or transmit a smart contract since the DTC code is irrelevant.

At the claim portion 215, the process 200 may proceed to block 260. Here, the third-party entity such as the supplier 170 and/or the insurance owner 172 may receive the smart contract from the server 162. The entity may determine whether the contract indicates a remedial need or not. For example, the entity may determine whether the smart contract includes a DTC fault that is relevant to their service. In the insurance example, the insurance company may determine whether the price of insurance should be adjusted based on a certain DTC. In the supplier example, the supplier may determine whether or not a deficiency with a part is their responsibility or not. If the third party determines that action is required, the process 200 may proceed to block 265. If not, the process 200 may proceed to block 270.

At block 265, the third-party entity may perform an action related to the smart contract/matrix in accordance with the contract terms. As explained, this may include adjusting insurance rates, providing a remediation for a part or module, etc. At block 270, the third-party entity may decide that the received contract does not require action and may simply save the contract.

Figure 3:
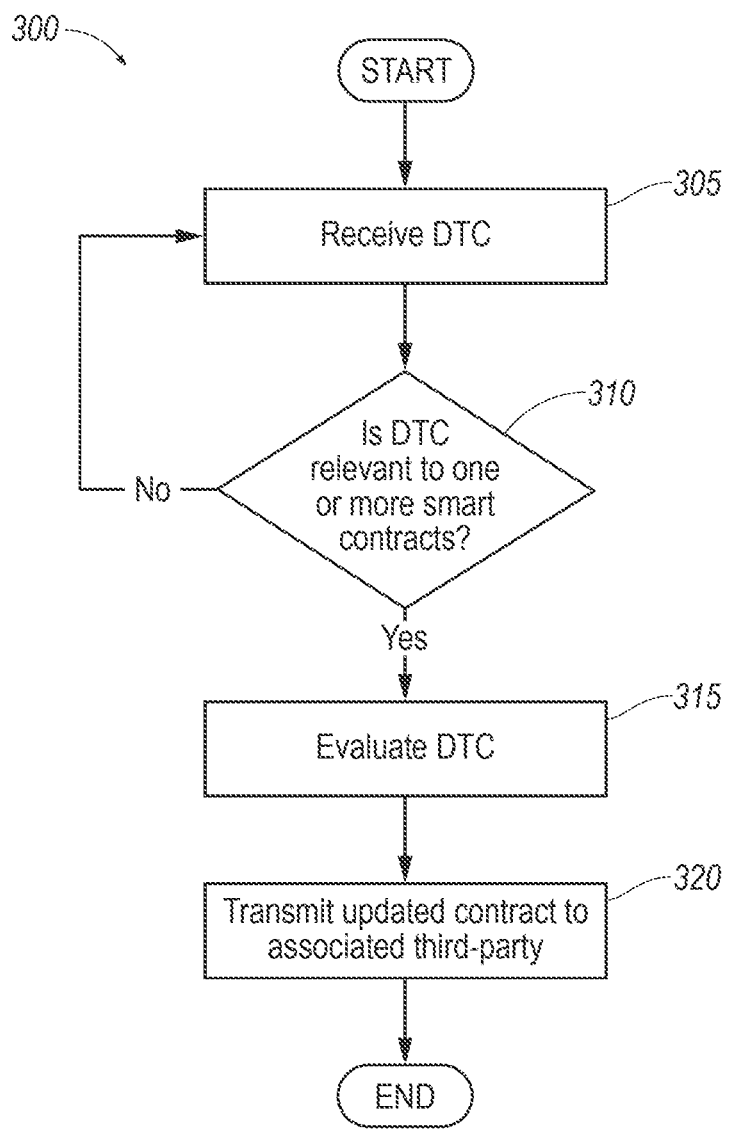
FIG. 3 illustrates an example process for the system of FIG. 1.

FIG. 3 illustrates an example process 300 for the system of FIG. 1. The process 300 may begin at block 305 where the server 162 may receive a DTC from the vehicle 102. The DTC may identify certain fault codes with respect to certain system and components.

At block 310, the server 162 may evaluate the DTC and determine whether the DTC is relevant to one or more smart contracts. For example, the server may compare the DTC with a list of relevant DTCs from the DTC database 164. The DTC may also be evaluated by reviewing one or more smart contracts stored in the database 164. In doing this, the server 162 may determine whether any of the stored smart contracts include provisions relating to a system associated with the DTC.

If the DTC includes a relevant code, the process 300 may proceed to block 315. If not, the process 300 may proceed to block 305.

At block 315, the server 162 may evaluate the DTC in view of the stored smart contracts for which the DTC is considered relevant. In one example, the DTC may include a BLIS error. The DTC database 164 may include a contract between an OEM and the supplier for the BLIS system. Thus, the DTC may be relevant to this contract. The server 162 may update the smart contract with the DTC relating to the BLISS system. This updated may include building a matrix from the DTC code. The matrix may include a table of DTC codes and contracts associated therewith. The matrix may also allow for tallying and maintaining codes received from the vehicle and associating those codes with certain contracts. The matrix may also maintain if and when codes are transmitted to an entity associated with the smart contract and/or with used to update a smart contract.

At block 320, the server 162 may transmit the smart contract to the third-party entity. As explained above, the third party, i.e., the insurance owner or supplier, may determine whether contractual obligations require remediation or adjustment of some sort in response to the DTC.

Accordingly, described herein is a contract management system for vehicles using DTCs as a way to update and track instances that may affect contractual obligations. In the examples herein, insurance companies may use the DTCs to enhance and generate price offerings, as well as manage claims. This may also be relevant to owners of fleets. The DTCs may be used to manage complex smart contracts, and aim to resolve certain faults, leverage the contract for remediation, and verify dynamic transactions. With the increase of usage-based insurance (UBI) pricing and smart contracts based on block chain technology, the system described herein may be used to manage and verify DTCs and pricings.

When DTCs are picked up from the vehicle, data may be sent over a network and back to an end system server. The server may act as a centralized hub for all of the data points. The system may next take that data and pipe and filter it through to compare it with smart contracts, and then funnel the data to the proper column and row pivots (e.g., databases, EXCEL sheets, etc.). The data may be built from the DTC outputs from the overall system and may enhance or highlight fault points, as well as identify the sources of the impacted system. This may allow for an enhance insurance matrix table against the cost and help identify where claims should be directed (e.g., OEM, supplier, etc.).

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system, comprising:
   a memory of a vehicle configured to maintain at least one smart contract between a manufacturer of the vehicle and a supplier of components to the manufacturer; and
   a processor of the vehicle configured to
      receive at least one diagnostic code from the vehicle, the diagnostic code being associated with at least one vehicle component,
      determine that the code is valid by determining whether the code is pending,
      in response to the code being valid and identified by the processor as being associated with the at least one smart contract, update the at least one smart contract within the memory with the code, and transmit the smart contract, as updated, to a third party associated with the vehicle component.

2. The system of claim 1, wherein the processor is further configured to update a matrix associated with the smart contract.

3. The system of claim 1, wherein the processor is further configured to determine that the code is valid by determining whether the code was received from a respective module for a predetermined amount of time following a key-on cycle.

4. The system of claim 1, wherein the processor is further configured to determine that the code is valid by determining whether the code was received for a predetermined amount of warm-up cycles.

5. The system of claim 1, wherein to determine whether the code is associated with the at least one smart contract includes comparing the code with a list of relevant codes within the memory.

6. The system of claim 1, wherein to determine whether the code is associated with the least one smart contract includes the smart contract referencing the vehicle component associated with the code.

7. A smart contract system for managing vehicle error codes, comprising:
   a memory configured to maintain at least one smart contract associated with a vehicle; and a processor configured to
    receive at least one diagnostic code from the vehicle, the diagnostic code being associated with at least one vehicle component,
    in response to determining that the code is valid and relevant to the at least one smart contract, update the at least one smart contract within the memory with the code, wherein the determining whether the code is relevant includes comparing the code with a list of relevant codes within the memory, and
    transmit the smart contract, as updated, to a third party associated with the smart contract.

8. The system of claim 7, wherein the processor is further configured to update a matrix associated with the smart contract.

9. The system of claim 7, wherein the processor is configured to determine that the code is valid by determining whether the code is pending.

10. The system of claim 7, wherein the processor is further configured to determine that the code is valid by determining whether the code was received from a respective module for a predetermined amount of time following a key-on cycle.

11. The system of claim 7, wherein the processor is further configured to determine that the code is valid by determining whether the code was received for a predetermined amount of warm-up cycles.

12. The system of claim 7, wherein the determining whether the code is relevant includes the smart contract referencing the vehicle component associated with the code.

13. A method for managing smart contracts and vehicle error codes relevant to the smart contracts, comprising:
    receiving at least one diagnostic code from a vehicle, the diagnostic code being associated with at least one vehicle component;
    determining that the code is valid;
    in response to determining that the code is valid, determining whether the code is relevant to at least one smart contract; and
    in response to the code being relevant, updating the at least one smart contract within with the associated code, wherein the determining whether the code is relevant includes the smart contract referencing the vehicle component associated with the code, and transmit the updated smart contract to a third party associated with the smart contract.

14. The method of claim 13, further comprising updating a matrix associated with the smart contract.

15. The method of claim 13, further comprising determining that the code is valid by determining whether the code is pending.

16. The method of claim 13, further comprising determining that the code is valid by determining whether the code was received from a respective module for a predetermined amount of time following a key-on cycle.

17. The method of claim 13, further comprising determining that the code is valid by determining whether the code was received for a predetermined amount of warm-up cycles.

* * * * *